Sept. 21, 1965  H. GELLER  3,207,831

METHOD OF MAKING A COATED PANEL

Filed Aug. 23, 1962

INVENTOR.
HARRY GELLER
BY *Derek P Lawrence*

HIS ATTORNEY

3,207,831
METHOD OF MAKING A COATED PANEL
Harry Geller, Louisville, Ky., assignor to General Electric Company, a corporation of New York
Filed Aug. 23, 1962, Ser. No. 218,998
5 Claims. (Cl. 264—271)

This invention relates to a method of making sheet metal panels provided with a plastic coating, and more particularly to a method of making such panels wherein improved coverage of the edge of the panel is insured.

Briefly stated, in accordance with one aspect of my invention, I provide a method of coating a sheet metal panel with a plastic material wherein the relatively flat surface of the panel is coated in the usual manner, such as, for instance, spraying, so as to provide a layer of plastic material thereon. In order to provide an adequate coating on the edge of the panel a strip of plastic material is extruded onto that edge. The plastic material of the strip has a high viscosity so that it will substantially retain its thickness. The sides of this strip are folded down against the surfaces of the panel, and preferably I cause this to be effected by gravity; this may readily be done by causing the viscosity to be such that the sides of the strip fold over of their own weight while still retaining the substantial thickness previously mentioned. As a final step, the panel is heated so as to flux the plastic material and so as to bond the layer and the extruded strip to the panel.

The subject matter which I regard as my invention is particularly pointed out and distinctly claimed in the concluding portion of this specification. My invention, however, together with further objects and advantages thereof, may best be understood by reference to the following description taken in conjunction with the accompanying drawing.

Figure 1:
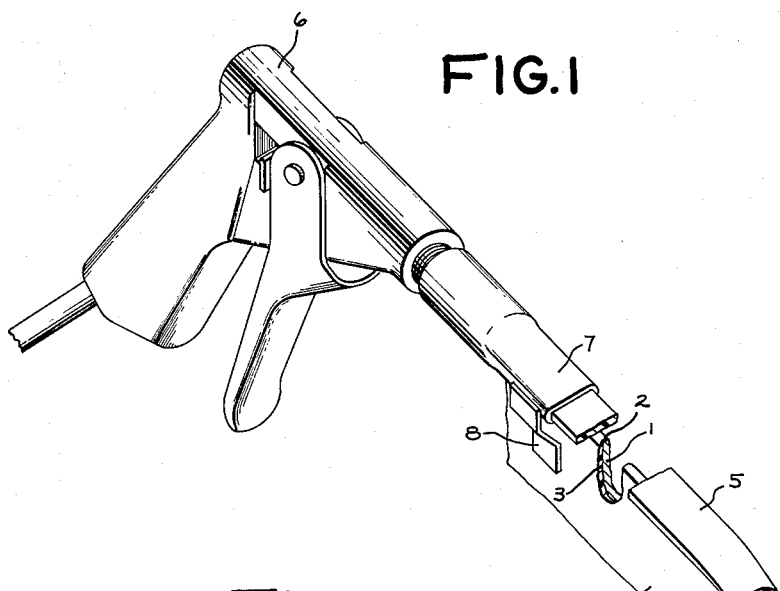
FIGURE 1 is a view in perspective illustrating the step of depositing the extruded strip on the edge of the panel.

Referring now to the drawing, the numeral 1 designates a sheet metal panel which may, for instance, be utilized as one of the walls of a dishwasher tub. The panel terminates at the top in an edge portion 2. While the outer surface (not shown) of panel 1 will not normally be subject to severe corrosion, the inner surface 3 thereof, being one of the surfaces of a dishwasher tub in the example given, must be protected against the corrosive effects of detergents, food acids and the like.

Accordingly, coatings of thermoplastic material, such as plasticized vinyl, have been used in the past to coat the entire inner surface of the dishwasher tub. Since the upper edge 2 of the panel is frequently exposed to some of the fluid circulated within the dishwasher, attempts have been made to thoroughly coat this edge surface as well.

While plastics in liquid form may be successfully and effectively sprayed on flat surfaces, such as the inner surface 3, so as to form a coating 4 thereon, spray coating of edge portions of the panel has not proved to be completely effective; it is difficult to make sure that a coating of proper thickness over the entire edge is always achieved. This is also true even where the liquid is brushed on, since there is a tendency for the edge of the panel to extend through the coating regardless of how the liquid is provided. As a practical matter, unless something additional is done, thin spots and gaps in the coating on edge 2 sometimes may develop, and the corrosive action which begins in such areas may proceed into the panel along the surface and under the coating.

Figure 2:
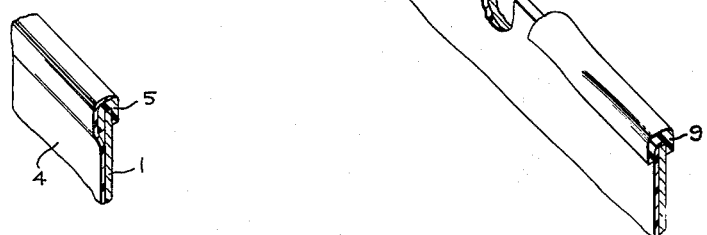
FIGURE 2 is a fragmentary view in perspective showing the panel after the sides of the strip have been folded down against the surfaces of the panel.

In accordance with the present invention, I extrude onto the edge 2 of panel 1 a strip 5 of plastic material from any appropriate tool such as, for instance, an extrusion gun, generally indicated at 6, having a nozzle 7 adapted to form or extrude the material issuing therefrom into a flat strip as shown. Suitable means for helping an operator to guide the gun 6 along the edge 2 of panel 1 may be provided in the form of a guide member 8 which slides along the surface of the panel 1 so as to maintain the gun steadily on the proper path as the operator moves it along the edge of the panel. The extruded strip is of a viscosity such that it retains sufficient thickness to do a complete job of protecting the top edge of panel 1, but so that the sides of the strip may be folded down as shown in FIGURE 2 to lie against the flat surfaces of the panel 1.

It will be recognized that a wide variety of characteristics may be provided to the material of strip 5 depending upon the thickness desired. For instance, it has been found that, using a vinyl material and providing a viscosity of 90,000 to 100,000 centipoises (Brookfield #7 spindle at 20 r.p.m. and 75° F.), a strip having a thickness of .040 to .060 inch will retain substantially all of that thickness, yet will have sufficient yield so that the sides of the strip will fold down of their own accord under the influence of gravity into the position shown at 9 in FIGURE 1. Of course, if a lesser thickness is appropriate, the viscosity may be changed so that there is a slightly greater tendency to flow; it will be understood, however, that my invention is restricted to those cases where, until fluxing, the strip 5 substantially retains its own identity separate from the deposited layer 4.

It will be understood that the thixotropy of the materials, that is, the dependency of the viscosity on flow rate, may be varied and can be used to compensate, to a limited extent, for differing viscosities. Thus, if the thixotropy of the materials increases somewhat, the viscosity of a strip of plasticized vinyl material which is intended to remain at approximately .040–.060 inch of thickness over the edges may be decreased to about 60,000 centipoises. Thus, while my preferred contemplated range of viscosity lies between 90,000 and 120,000 centipoises (Brookfield #7 spindle at 20 r.p.m. and 75° F.), it will be understood that variations in these figures may be had without necessarily departing from the scope of my invention. The basic intent is that until a fluxing operation is performed the strip 5 substantially retains its own identity, although it may be deformed into the position shown at 9. While suitable means for pressing down the sides of the strip may be used if so desired in order to cause the strip 5 to assume the position shown at 9, I prefer greatly to cause this to be effected solely by gravity as set forth above.

After the strip 5 of material has been deposited on the edge 2 of panel 1, and the sides of the strip have been folded down as shown at 9, the panel is appropriately fluxed. This may be effected, in the case of vinyls (of which both the strip and the deposited layer are basically composed in the present case) by heating in the range of 350° to 450° F. for about 30 to 15 minutes. Because the strip 5 and the layer 4 are compatible, this operation causes the strip and the layer to be fused to each other and to the surface of panel 1 so as to form effective protection for the metal panel.

Of course, while the method has been described by extruding strip 5 onto edge 2 after layer 4 has been deposited on surface 3, it will be understood that these two operations may be reversed and constitute an exact equivalent. Thus, as shown in FIGURE 2, the strip 5 may be provided first and the layer 4 deposited afterwards with equally successful results.

Figure 3:
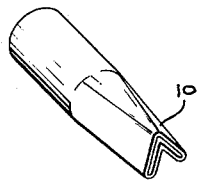
FIGURE 3 is a view in perspective illustrating a modified extruding tip which may be used in the practice of my improved method.

It will further be seen that, referring to FIGURE 3, the characteristics of the strip may be varied and the operation assisted by providing a strip which, instead of being flat as in the case of strip 5, is extruded by a nozzle such as that shown at 10. Nozzle 10 is not flat, but rather has an inverted V-shape so that the sides of the strip, when they come out of the nozzle, are already extending down a substantial distance towards engagement with the surfaces of the panel 1.

It will be seen from the foregoing that my invention provides an easily achieved, highly effective, method of providing edge coverage of a plastic coated panel.

While I have shown and described a particular embodiment of my invention, I do not desire the invention to be limited to the particular construction and order of method steps disclosed (except where language clearly relating to order such as the word "finally" is used) and I intend by the appended claims to cover all modifications within the true spirit and scope of my invention.

It will be understood that I contemplate that my invention will be used after proper preparation of the surface of panel 1, as is conventional in the art. Thus, for instance, at the present time it is conventional to clean the panel thoroughly by subjecting it to an alkali cleaning process and then to provide a zinc phosphate coating thereon. After this, the panel is coated with a phenolic base primer adhesive or any other suitable primer adhesive. These preliminary steps are conventional and are not considered to be restrictive upon or form a part of my invention inasmuch as my improved method is provided after all such necessary preliminary steps have been provided.

What I claim as new and desire to secure by Letters Patent of the United States is:

1. A method of coating a sheet metal panel with plastic material, comprising the steps of:
    (a) applying a layer of plastic material on the surface of the panel;
    (b) extruding onto the top edge of the panel a strip of plastic material having a width greater than the width of the top edge of the panel and having a high viscosity so as to substantially retain its thickness, said viscosity further being such as to cause the sides of said strip to bend downwardly under their own weight against the surfaces of the panel; and
    (c) finally heating said panel after the sides of said strip have folded down against the surfaces of said panel so as to flux said plastic material and bond said layer and said strip to said panel.

2. The method defined in claim 1 wherein the viscosity of said strip is in the range of 90,000 to 120,000 centipoises with a Brookfield setting of 20 r.p.m., #7 spindle, at 75° F.

3. The method defined in claim 1 wherein said strip is extruded so as to be flat at the time of extrusion.

4. The method defined in claim 1 wherein said strip is extruded so as to have the shape of an inverted V at the time of extrusion.

5. The method defined in claim 1 wherein said plastic material is a plasticized vinyl material.

References Cited by the Examiner

UNITED STATES PATENTS

| | | | |
|---|---|---|---|
| 2,412,429 | 12/46 | Slingluff et al. | 18—59 |
| 2,575,138 | 11/51 | Slaughter | 18—59 |
| 2,751,629 | 6/56 | Dick | 18—59 |
| 2,821,155 | 1/58 | Seckel | 18—59 |
| 3,035,956 | 5/62 | Gonda et al. | 156—201 |
| 3,066,063 | 11/62 | Ecklund et al. | 156—200 |
| 3,138,513 | 6/64 | Duncanson et al. | 156—497 |

ROBERT F. WHITE, *Primary Examiner.*

ALEXANDER H. BRODMERKEL, *Examiner.*